A. R. FLINT.
DEVICE OR MEANS FOR GIVING STEREOSCOPIC OR DISTANCE EFFECT TO MOVING PICTURES SHOWN UPON SCREENS.
APPLICATION FILED JUNE 25, 1918.

1,284,084.

Patented Nov. 5, 1918.

INVENTOR:
Abraham Reginald Flint
By Wm Wallace White
ATTY

UNITED STATES PATENT OFFICE.

ABRAHAM REGINALD FLINT, OF DERBY, ENGLAND.

DEVICE OR MEANS FOR GIVING STEREOSCOPIC OR DISTANCE EFFECT TO MOVING PICTURES SHOWN UPON SCREENS.

1,284,084.  Specification of Letters Patent.  Patented Nov. 5, 1918.

Application filed June 25, 1918. Serial No. 241,613.

*To all whom it may concern:*

Be it known that I, ABRAHAM REGINALD FLINT, a subject of the King of Great Britain and Ireland, residing at 42 Full street, Derby, in the county of Derby, England, have invented new and useful Improvements in Devices or Means for Giving Stereoscopic or Distance Effect to Moving Pictures Shown Upon Screens, of which the following is a specification.

Figure 1:
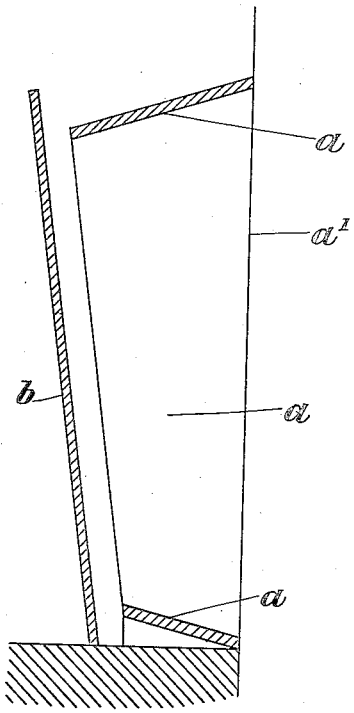

Referring to the drawings which form a part of this specification Figure 1 is a sectional view illustrating an application of my invention.

Figure 2:
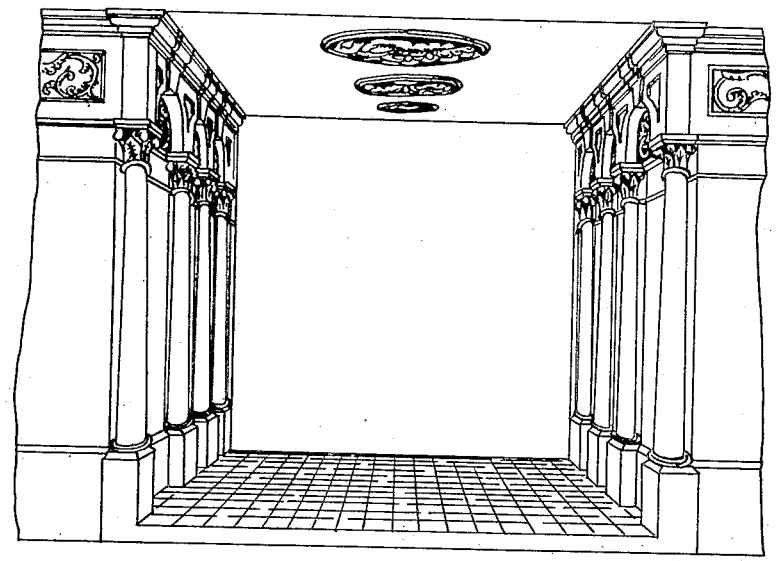

Fig. 2 is a perspective sketch to be hereinafter further described.

My said invention relates to a device or means for giving stereoscopic or distance effect to moving pictures shown upon a screen, and in carrying the same into effect I arrange a proscenium $a$ of box or cone shape at an interval in front of the screen $b$, the picture is thus exhibited as though shown at a distance through an elongated aperture.

By arrangement of lighting effect thrown across, behind and / or before such proscenium, but not impinging upon the screen, this effect is intensified making the picture appear stereoscopic.

I further employ various decorative treatments of the proscenium between the front face $a^1$ thereof and the screen $b$ to assist in giving the stereoscopic effect or effect of distance, such treatment if desired being arranged to harmonize with the subjects being thrown upon the screen; for example, the sides of the proscenium may be treated to represent the rapidly vanishing sides of an apartment or a continuation of the sides of the theater, or of a street or parts of an open-air scene; the top of the proscenium may represent the ceiling of an apartment or the sky; and the bottom thereof the floor of an apartment, ground surface, sea or the like; each being apropriately decorated. Again said sides, top or bottom may be made up of overlapping devices after the manner of stage scenery if desired.

An example of the treatment of the proscenium to represent the interior of an apartment is shown on Fig. 2.

The illusion of actual depth or stereoscopic effect is created by this device in two ways. (*a*) By the perspective effect of distance created by the device, the eye receives a distance illusion from the surroundings and unconsciously carries this idea of gradually increasing distance into the flat picture itself, the movement of the objects shown upon the screen increasing the illusion that they actually stand in front of their background. (*b*) The surrounding device forming an aperture in front of the picture; when the eye is fixed upon the latter the structure of the device impinges on the line of vision of each eye at a slightly different angle, the two eyes therefore do not take identical vision as they would from a flat surface, and the receipt by each eye of a different picture produces the effect of stereoscopy.

Having now described my invention what I claim as new and desire to secure by Letters Patent is:—

In combination, a motion picture screen and a proscenium associated with the screen and tapered, and decorated to produce a perspective effect and an illusion of distance.

In testimony whereof I have signed my name to this specification.

ABRAHAM REGINALD FLINT.